June 10, 1958 A. THOMAS 2,838,316
ADJUSTABLE BORING BAR ASSEMBLY
Filed April 20, 1955
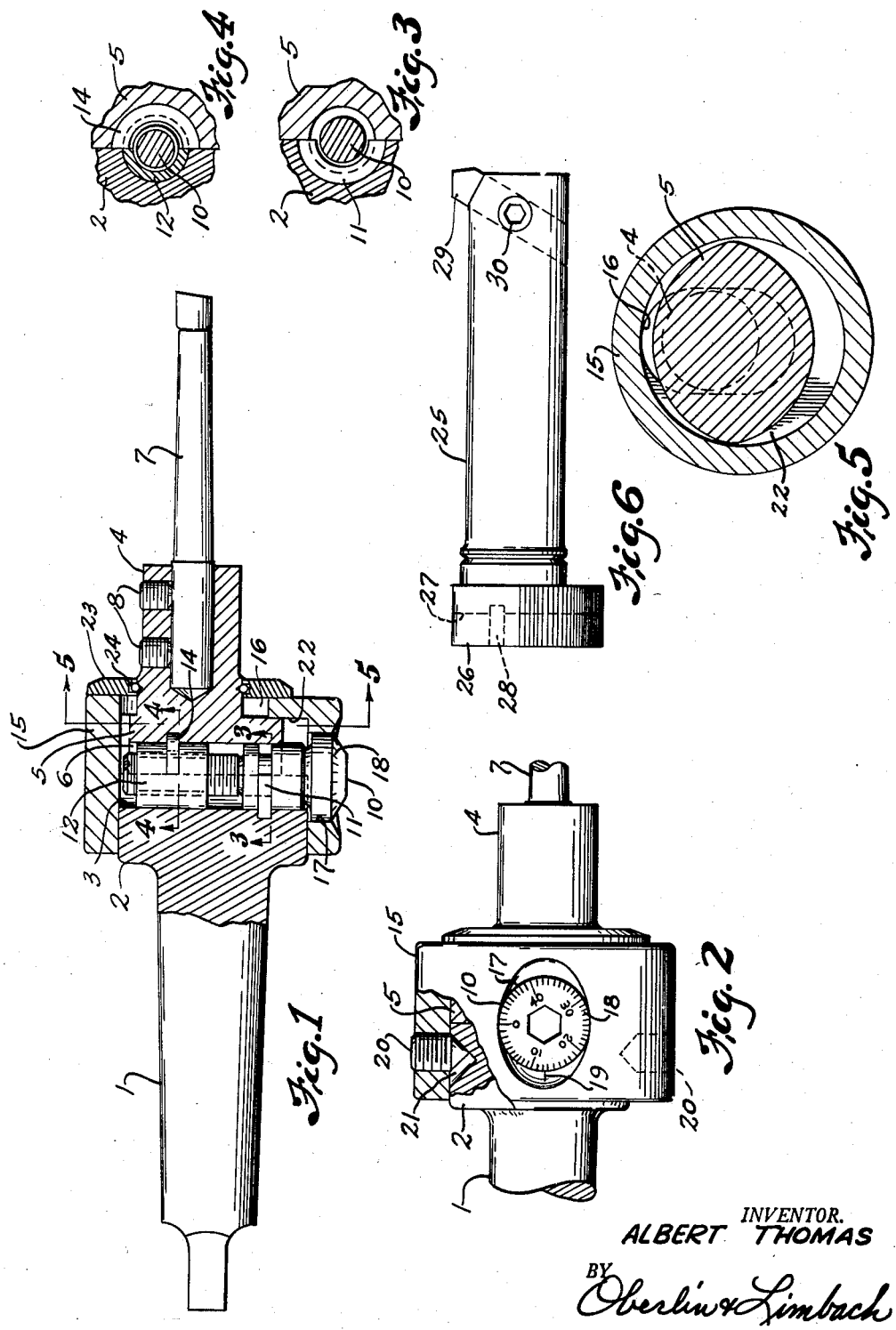
INVENTOR.
ALBERT THOMAS
BY
Oberlin & Limbach
ATTORNEYS

United States Patent Office 2,838,316
Patented June 10, 1958

2,838,316

ADJUSTABLE BORING BAR ASSEMBLY

Albert Thomas, Munhall, Pa.

Application April 20, 1955, Serial No. 502,694

5 Claims. (Cl. 279—6)

The present invention relates generally as indicated to an adjustable boring bar assembly, and more particularly to such assembly of the type wherein the bit holder proper is adjustable radially with respect to a shank or like member which is adapted to be fixedly mounted to a machine tool, for example to the spindle thereof, or, as in the case of a turret lathe, to one of the turret stations thereof.

There are, of course, a number of different types of adjustable boring bars now available commercially, but in most of them, if not all, an adjusting screw bears on an end of the bit or else the bit itself is of relatively complicated form with threads, grooves, or the like formed therein to provide for micrometer adjustment.

It is a primary object of this invention to provide a compact, lightweight, and economical assembly which adjustably and securely mounts a conventional form of boring bit therein without requiring any special formations on the bit itself.

It is another object of this invention to provide an adjustable boring bar assembly which is composed essentially of a shank member and a bit holder which are securely fastened together so as to effectively withstand bending, axial thrust, and torque loads while yet capable of accurate radial adjustment with respect to one another.

It is another object of this invention to provide an adjustable boring bar assembly which has associated therewith a simple adjusting mechanism which provides for a wide range of adjustment and which has an easily accessible adjusting screw with visible indicia by means of which accurate radial shifting of the bit holder member relative to the shank member may be achieved.

Another object of this invention is to provide an adjustable boring bar assembly in which lock screws or the like need not be loosened in order to effect desired accurate adjustment of the bit holder member with respect to the shank member, but yet any adjustments which are made are held against variation incidental to the use of the boring bar assembly.

It is another object of this invention to provide an adjustable boring bar assembly which interchangeably accommodates bit holders for different types of boring bits.

Another object of this invention is to provide an adjustable boring bar assembly which has a unique distribution of the weights of the parts thereof so that there is only a slight unbalance in the minimum and maximum radial positions of the bit holder in favor of the side opposite to the cutting edge of the bit and the same side as the cutting edge respectively with perefct balance in an intermediate adjusted position of said bit holder.

Other objects and advantages of the present invention will become apparent as the following description proceeds.

To the accomplishment of the foregoing and related ends, the invention, then, comprises the features hereinafter fully described and particularly pointed out in the claims, the following description and the anexed drawing setting forth in detail certain illustrative embodiments of the invention, these being indicative, however, of but a few of the various ways in which the principle of the invention may be employed.

In said annexed drawing:

Fig. 1 is a longitudinal cross-section view of one embodiment of the invention;

Fig. 2 is an elevation view, partly in section, as viewed upwardly from the bottom of Fig. 1;

Figs. 3, 4, and 5 are cross-section views taken respectively along the lines 3—3, 4—4, and 5—5 of Fig. 1; and Fig. 6 is an elevation view of a modified form of boring bit holder member.

Referring now more particularly to the drawing and first to the form of the invention illustrated in Figs. 1–5, the adjustable boring bar assembly herein comprises a shank 1 adapted for mounting in a turret station of a turret lathe or in a spindle or other part of a machine tool. Said shank 1 has a head 2 formed at its end with a semi-cylindrical groove 3 diametrically thereacross.

The bit holder 4 has an enlarged head 5 which is of generally oval or elliptical cross-section, and the end of said head abuts the end face of the shank head 2. The end of the bit holder head 5 is formed with a semi-cylindrical groove 6 thereacross which is complemental with the groove 3 so as to define between the abutting heads 2 and 5 a cylindrical bore. The bit holder 4 has a boring bit 7 secured thereto by means of the set screws 8.

An adjusting screw 10 is rotatable in the hole defined by the mating grooves 3 and 6 but is axially fixed therein by the semi-annular washer 11 which engages in a peripheral groove formed in the screw 10 and in a semi-annular groove formed in the shank head 2.

A nut 12 is closely fitted in the hole defined by the grooves 3 and 6 and has threaded engagement with said adjusting screw 10. However, the nut 12 is held against rotation in the hole aforesaid and is held against axial movement relative to the bit holder 4 by means of the half washer 14 which is engaged in a peripheral groove extending half-way around the nut and in a semi-annular groove formed in the bit holder 4.

Accordingly, it can now be seen that, when the adjusting screw 10 is rotated in either direction, the nut 12 will be moved axially along the screw 10 to cause a corresponding radial movement of the bit holder 4 with respect to the shank 1.

There is provided a housing 15 which surrounds the heads 2 and 5, said housing 15 being formed with an oblong slot 16 to accommodate the radial adjusting movement of that portion of the bit holder 4 which projects through the slot 16. Said housing 15 is in addition, provided with a hole 17 in which the head of the adjusting screw 10 is rotatable, the latter being formed with radial indicia 18 cooperating with a mark 19 formed on the housing. Preferably, the indicia 18 are spaced apart so that from one radial mark to the next indicates .001" radial movement of the bit holder 4 or any other desired value which, of course, will depend on the pitch of the threads of the adjusting screw.

The housing 15 serves to clamp the shank head 2 and the bit holder head 5 in juxtaposed end-to-end relationship through oppositely arranged conical point screws 20 which engage the inclined walls of the recesses 21 formed in the periphery of the head 2 as by means of an end mill. As evident, when the screws 20 are turned in, the conical points thereof wedge the head 2 toward the right as viewed in Fig. 2 to clamp the head 5 against the inturned shoulder 22 of said housing 15.

It has been found that, even though the heads 2 and 5 rather tightly frictionally engage each other, it is yet possible to turn the adjusting screw 10 without loosening the screws 20. In other words, the large mechanical advantage achieved through the threads of the screw 10 engaged with the threads of the nut 12 overcomes frictional clamping engagement of the head 5 between the head 2 and the shoulder 22. This clamping pressure may be released somewhat to facilitate the adjustment, but yet it will be unnecessary to retighten the screws 20 in order to be able to hold the adjustment against variation due to the use of the boring bar assembly.

The bit holder 4 has a dust cover 23 detachably secured thereto by means of a snap ring 24, said dust cover 23 being juxtaposed to the end of the housing 15 to overlie the slot 16 in all adjusted positions of the bit holder 4 to thereby prevent foreign matter from entering the housing.

In Fig. 6, there is shown a modified form of bit holder 25 which is provided with a head 26 corresponding to the aforedescribed head 5. Said holder 25 has a semi-cylindrical groove 27 and a semi-annular groove 28 to accommodate the nut 12 and the half washer 14 in the same way as is shown in Fig. 1.

The bit 29 fits into an angular hole in the end of the holder 25, and said bit is held therein by means of a set screw 30. The holder 25 is interchangeable with the holder 4.

In disassembling the boring bar assembly, the screws 20 are withdrawn out of the recesses 21, whereupon the shank 1 and its head 2 may be slipped out of the housing 15 with or without the half washer 11. Then the adjusting screw 10 may be unscrewed from the nut 12. Finally, the dust cover 23 is pried off so that the holder 4 may be slipped out of the housing 15 in a direction away from the shoulder 22. From the foregoing, it can be seen that disassembly and assembly of the boring bar herein is easily and quickly accomplished.

By reason of the provision of the clamping of the opposite parallel flat faces of the head 5 between the end of head 2 and the inturned shoulder 22, there can be no wobbling in any direction of the holder 4 with respect to the shank 1. In addition, axial thrust and torque loads imposed by the bit on the holder 4 are effectively resisted by the screws 20 which engage the shank head 2 on a large diameter and by the close fits of the cylindrical nut 12 and the cylindrical portions of the adjusting screw 10 in the hole defined by the complemental grooves 3 and 6.

Moreover, the adjusting screw 10 is easily accessible for rotation by a suitable hex or like wrench, and accurate adjustments can be made by reason of the indicia 18 and 19 which indicate directly the amount of adjusting movement of the holder 4 and the bit 7 secured thereto or the holder 25 and the bit 29 secured thereto.

With reference to the unique weight distribution, the head 5 is eccentrically disposed with respect to the shank of the holder 4 so that, in the minimum radial position adjustment of the holder 4, there is a slight overbalance in favor of the side of the holder opposite to the cutting edge of the bit. Likewise, in the maximum radial position adjustment of the holder 4, the overbalance is on the same side as the cutting edge of the bit.

In this way, there is never any great unbalance which would preclude high speed rotation of the boring bar assembly. With this weight distribution, there will be perfect balance at an intermediate position of the adjustment.

Other modes of applying the principle of the invention may be employed, change being made as regards the details described, provided the features stated in any of the following claims, or the equivalent of such, be employed.

I therefore particularly point out and distinctly claim as my invention:

1. An adjustable boring bar assembly comprising end-to-end juxtaposed shank and bit holder members which define a transverse bore therebetween, a housing for holding said members together but permitting relative transverse movement thereof axially of said bore, an adjusting screw rotatable in said bore, key means axially fixing said screw with respect to one of said members, a nut threaded on said screw for axial movement relative to said one of said members, key means holding said nut against rotation in said bore and against axial movement with respect to the other of said members whereby, upon rotation of said screw, said members are moved transversely with respect to one another, said bore comprising semi-cylindrical grooves in the juxtaposed end faces of said shank and bit holder members, said screw and said nut being fitted into said bore to constitute the sole torque-resisting means to key said members together against relative rotary movement.

2. An adjustable boring bar assembly comprising end-to-end juxtaposed shank and bit holder members which define a transverse bore therebetween, a housing for holding said members together but permitting relative transverse movement thereof axially of said bore, and adjusting screw rotatable in said bore and axially fixed with respect to one of said members, and a nut threaded on said screw for axial movement relative to said one of said members but held against rotation in said bore and against axial movement with respect to the other of said members whereby, upon rotation of said screw, said members are moved transversely with respect to one another, said bore comprising semi-cylindrical grooves in the juxtaposed end faces of said shank and bit holder members, said screw and said nut being fitted into said bore to constitute the sole torque-resisting means to key said members together against relative rotary movement, each said groove having a concentric recess in which is disposed a half washer key, one key being engaged in a continuous peripheral groove formed in said adjusting screw and the other key being engaged in a half peripheral groove formed in said nut.

3. An adjustable boring bar assembly comprising end-to-end juxtaposed shank and bit holder members which define a transverse bore therebetween, a tubular housing surrounding the juxtaposed ends of said members and formed with an inturned shoulder having an opening through which said holder member projects and which opening is of size and shape permitting transverse movement of said holder member relative to said shank in a direction axially of said bore, said holder member being formed with a head inside said housing which overlies the edge of said opening and abuts said shoulder, clamping means for clamping said head between said shank member and said shoulder, adjusting means in said bore for transversely moving said holder member with respect to said shank member and said housing, and a dust cover removably carried by said holder member so as to overlie, in all adjusted transverse positions, the opening in said housing and thus prevent ingress of foreign matter into said housing.

4. An adjustable boring bar assembly comprising end-to-end juxtaposed shank and bit holder members which define a transverse bore therebetween, a tubular housing surrounding the juxtaposed ends of said members and formed with an inturned shoulder having an opening through which said holder member projects and which opening is of size and shape permitting transverse movement of said holder member relative to said shank in a direction axially of said bore, said holder member being formed with a head inside said housing which overlies the edge of said opening and abuts said shoulder, clamping means for clamping said head between said shank member and said shoulder, and adjusting means in said bore for transversely moving said holder member with respect to said shank member and said housing, said clamping means comprising a screw threaded into said housing and having wedging engagement with said shank member.

5. An adjustable boring bar assembly comprising end-to-end juxtaposed shank and bit holder members which define a transverse bore therebetween, a tubular housing surrounding the juxtaposed ends of said members and formed with an inturned shoulder having an opening through which said holder member projects and which opening is of size and shape permitting transverse movement of said holder member relative to said shank in a direction axially of said bore, said holder member being formed with a head inside said housing which overlies the edge of said opening and abuts said shoulder, clamping means for clamping said head between said shank member and said shoulder, and adjusting means in said bore for transversely moving said holder member with respect to said shank member and said housing, said holder member head being transversely offset with respect to the projecting portion of said holder member to render said assembly balanced in an in-between adjusted position of said holder member and only slightly unbalanced in the extreme adjusted positions.

References Cited in the file of this patent

UNITED STATES PATENTS

| | | |
|---|---|---|
| 892,894 | Roman | July 7, 1908 |
| 1,153,673 | Bryant | Sept. 14, 1915 |
| 2,654,610 | De Vlieg | Oct. 6, 1953 |
| 2,661,218 | Snow et al. | Dec. 1, 1953 |